Jan. 16, 1923.
H. SUNDHAUSSEN.
LONG DISTANCE CONTROL OF STABILIZED BODIES.
FILED SEPT. 3, 1920.
1,442,191.
2 SHEETS—SHEET 1.
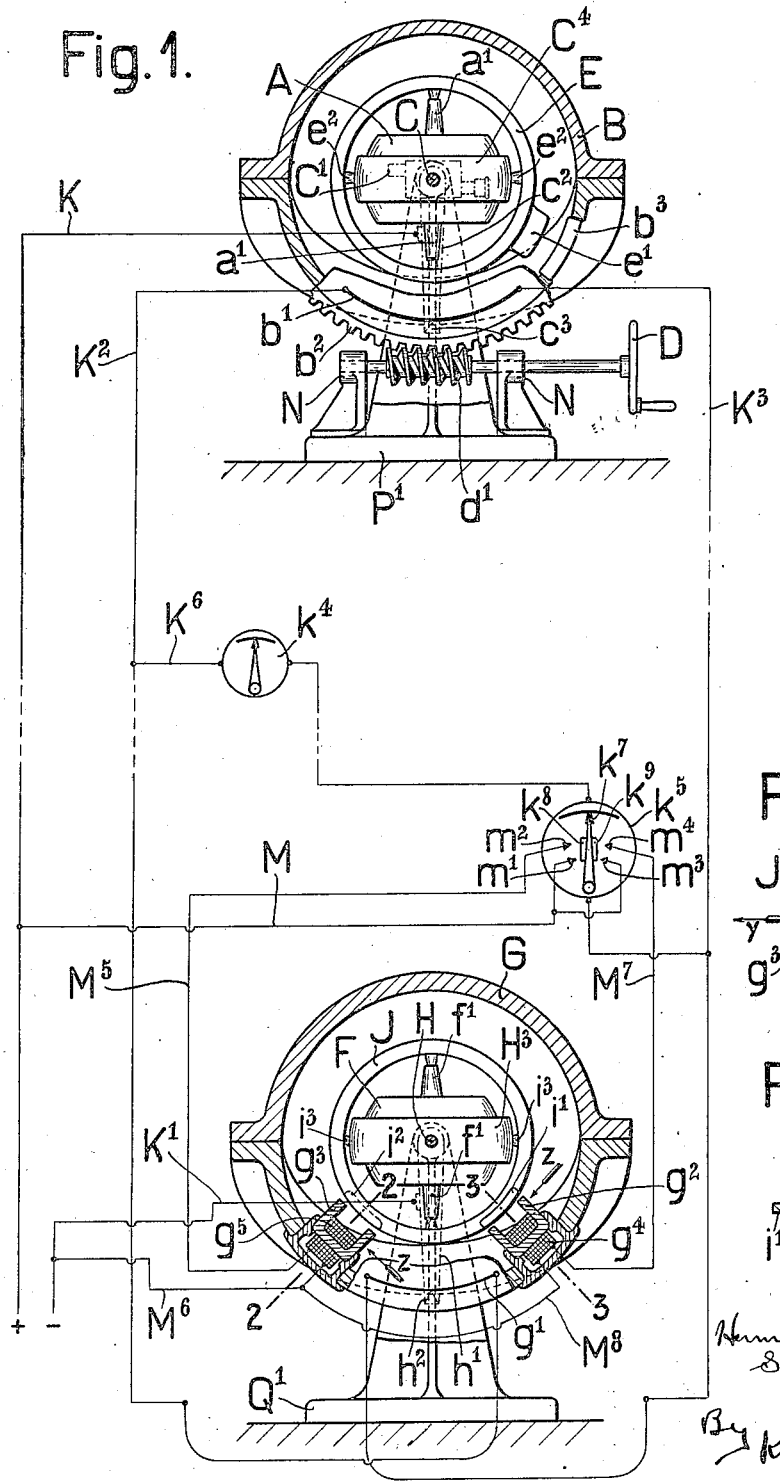
Fig.1.
Fig.2.
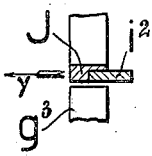
Fig.3.
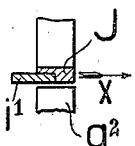
Inventor
Hermann Sundhaussen,
By Knight Bros.
Attys

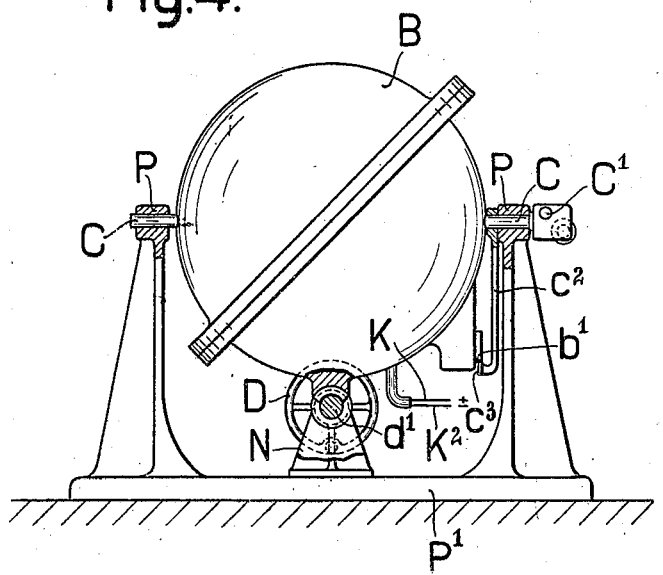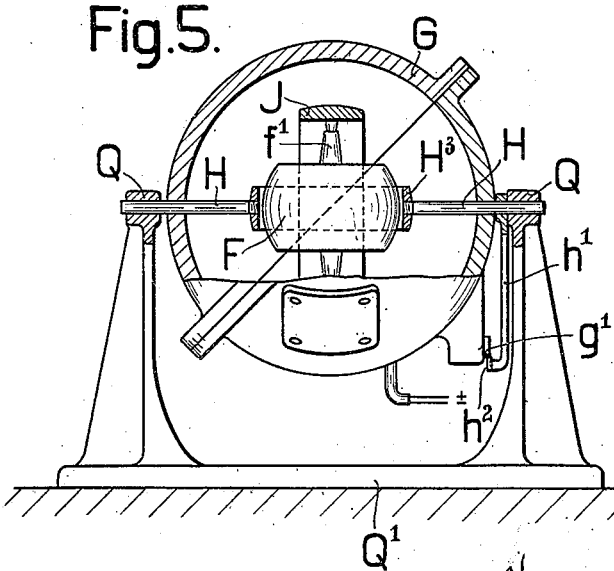

Patented Jan. 16, 1923.

1,442,191

UNITED STATES PATENT OFFICE.

HERMANN SUNDHAUSSEN, OF ESSEN, GERMANY, ASSIGNOR TO FRIED. KRUPP AKTIENGESELLSCHAFT, OF ESSEN-ON-THE-RUHR, GERMANY.

LONG-DISTANCE CONTROL OF STABILIZED BODIES.

Application filed September 3, 1920. Serial No. 408,086.

*To all whom it may concern:*

Be it known that I, HERMANN SUNDHAUSSEN, residing at Essen, Germany, a citizen of the German Republic, have invented a certain new and useful Improvement in Long-Distance Control of Stabilized Bodies, of which the following is a specification.

This invention relates to an apparatus for the long distance control of a body able to be stabilized by a gyroscope and which in addition to being of simple construction ensures very great accuracy of adjustment for which invention I have filed an application in Germany June 21, 1917.

The invention will be described with reference to the accompanying drawings in which Figure 1 shows diagrammatically a construction of the invention.

Figures 2 and 3 are sections on the lines 2—2 and 3—3 of Figure 1 respectively, looking in the direction of the arrow $z$.

Fig. 4 is a view partly in section, of a portion of Fig. 1, looking from the left and Fig. 5 is a view, partly in section, of another portion of Fig. 1 also looking from the left.

At an observing station, forming the transmitting station a gyroscope A is pivoted in a Cardan ring E to turn about a vertical axis; the shaft $a^1$ of the gyroscope. The ring E, in turn, is oscillatably mounted, by means of two inwardly projecting, co-axial pins $e^2$, on a horizontal Cardan ring $C^4$. The ring $C^4$ is oscillatably mounted, by means of two co-axial pins C, passing through the walls of a two-part casing B, in two bearings P connected to each other by a common bed plate $P^1$ (Figs. 1 and 4). The casing B, in turn, is pivoted on the pins C. To swing the casing B the hand wheel D is operated, the shaft of which, journalled in a part N mounted on the bed plate $P^1$, carries a worm $d^1$ meshing with a worm wheel $b^2$ on the casing B. On one of the pins C, projecting through the casing B, as shown in the drawing, is mounted a sighting telescope $C^1$ and a downwardly extending pointer $c^2$. The pointer $c^2$ carries on its lower end a circuit contact $c^3$, which slides over a resistance wire $b^1$, mounted on the casing B concentric with the pin C. The ring $C^4$, pins C, telescope $C^1$ and pointer $c^2$, together form the stabilizable part of gyroscope apparatus. The general arrangement of the apparatus is such that when the telescope $C^1$ is directed horizontally and when the casing is in the position shown in the drawing the circuit closing device $c^3$ touches the resistance wire $b^1$ in the middle.

On the Cardan ring E, which carries the gyroscope is mounted an upright rib $e^1$ which is accessible through an opening $b^3$ in the casing B, so that a pressure directed vertically to the plane of the paper can be exerted thereon for the purpose of adjusting the telescope $C^1$ and with it the pointer $c^2$.

At a distance receiving station, a second gyroscope F (Figs. 1 and 5) is rotatably mounted in a Cardan ring J on a vertical axis; axis of the gyroscope shaft $f^1$. The ring J, in turn, is oscillatably mounted, by means of two inwardly projecting, co-axial pins $i^3$, in a horizontal Cardan ring $H^3$. The ring $H^3$ is oscillatably mounted, by means of two co-axial pins H, passing through the walls of a two-part casing G, in two bearings Q connected to each other by a common bed plate $Q^1$. The ring $H^3$ in connection with the shaft H and the pointer $h^1$, forms the stabilizable part of the second gyroscope apparatus.

On the end of the stabilizable shaft H which projects from the casing is mounted a downwardly extending pointer $h^1$, which is adapted to travel by means of a circuit closing device on its point over a resistance wire $g^1$ provided on the casing G, which latter is capable of being rocked by an arrangement (not shown) about an axis which coincides with the axis of the stabilizable shaft H. On the Cardan ring J which carries the gyroscope are fixed in the manner shown in the drawing, two magnet armatures $i^1$ and $i^2$ projecting beyond the side walls of the Cardan ring J (see particularly Figures 2 and 3) which are located symmetrically to the plane of the picture and one of which ($i^1$) is mounted on the side next to the observer and the other one ($i^2$) on the remote side of the ring J. The corresponding magnet bodies $g^2$ and $g^3$ of the electromagnets which carry the exciting coils $g^4$ and $g^5$ are of horse shoe shape and are so fixed in the casing G that when the Cardan ring J is in the upright middle position they are situated symmetrically to the middle plane of this Cardan ring.

Of the two circuit closing devices $c^3$ and $h^2$ which travel over the resistance wires $b^1$ and $g^1$ one ($c^3$) is connected by a conductor K to the positive pole of a source of continuous current and the other one ($h^2$) is connected by a conductor $K^1$ to the negative pole of the source of continuous current. From the ends of the resistance wire $b^1$ lead conductors $K^2$ and $K^3$ to each end of the resistance wire $g^1$. The circuit closing devices $c^3$ and $h^2$ form accordingly the beginning and the end of a two part branch circuit between the two limbs $K^2$ and $K^3$ of which there is placed after the manner of the Wheatstone bridge connection a bridge $K^6$ provided with two sensitive galvanometers $k^4$ and $k^5$. The galvanometer $k^4$ is so arranged that its indicating apparatus is visible to the gun layer who rotates the hand wheel D, while the galvanometer $k^5$ is placed in the vicinity of the gyroscopic apparatus situated at the receiving station. The pointer $k^7$ of the galvanometer $k^5$ carries two laterally arranged circuit closing devices $k^8$ and $k^9$, of which circuit closing devices the one ($k^8$) is capable, on the outward swing of the pointer $k^7$, to come in contact with two circuit closing devices $m^1$ and $m^2$ and the other one ($k^9$) with two circuit closing devices $m^3$ and $m^4$, and thus bridge over a gap which lies between the circuit closing devices $m^1$ $m^2$ and $m^3$ $m^4$. The circuit closing devices $m^1$ and $m^3$ are connected in the manner shown in the drawing by a conductor M to the positive pole of the source of continuous current. From the circuit closing device $m^2$ a conductor $M^5$ leads to one end of the exciting coil $g^3$, the other end of which is connected through a conductor $M^6$ to the negative pole of the source of continuous current. In like manner a conductor $M^7$ leads from the circuit closing device $m^4$ to one end of the exciting coil $g^4$ the other end of which is likewise connected to the negative pole of the source of continuous current through an intermediate conductor $M^8$ and the conductor $M^6$.

In the description of the working of the above described apparatus let it be assumed that the circuit closing devices $c^3$ and $h^2$ are situated in the centre of the resistance wires $b^1$ and $g^1$ when the gyroscopes A and F are in motion. Each of the gyroscopes A and F may be driven by a motor of the kind described in application Ser. No. 425,104 or by any other suitable motor. In this position the two branch circuits containing the conductors $K^2$ and $K^3$ are traversed by a current of equal tension and the bridge branch $K^6$ is therefore devoid of current. The pointers of the two galvanometers $k^4$ and $k^5$ therefore assume their zero positions as shown in the drawing, in which positions the circuit closing devices $k^8$ $m^1$ $m^2$ and $k^9$ $m^3$ $m^4$ are open and the exciting coils $g^3$ and $g^4$ are therefore devoid of current.

If now by rotating the hand wheel D or by putting lateral pressure on the sighting rib $e^1$ the angular position of the pointer $c^2$ which carries the circuit closing device $c^3$ be altered with respect to the resistance wire $b^1$, the resistance value of resistance wire $b^1$ situated on the one side of the circuit closing device $c^3$ will be increased by the same amount as the resistance value lying on the other side is diminished. Between the connecting points of the bridge branch $K^6$ therefore exists a difference of tension, and the bridge branch $K^6$ accordingly receives current. The two galvanometers therefore swing outwards in the same direction, and let it be assumed that the swing of the galvanometers takes place in such a direction that the pointer $k^7$ touches the two circuit closing devices $m^3$ $m^4$ with one circuit closing device $k^9$. This causes a circuit leading from the positive pole of the source of current to the negative pole to be closed through M $m^3$ $m^4$ $M^7$ $g^4$ $M^8$ $M^6$ and the exciting coil $g^4$ accordingly receives a current. The electromagnet $g^4$ $g^2$ exerts a force in the direction of the arrow $x$ (see Figure 3) on the armature $i^1$ fixed to the Cardan ring J which acts in a lateral direction and which tends to rotate the Cardan ring J about the axis of its horizontal pin (see Figure 1). The result of this force is that the gyroscope together with the two Cardan rings and the pointer $h^1$ begins to turn about the axis of the stabilizable shaft H. The circuit closing device mounted on the pointer $h^1$ also executes a movement with respect to the resistance wire $g^1$ which is in the same direction as the movement of the circuit closing device $c^3$ relatively to the resistance wire $b^1$ above referred to. As soon during the course of the aforesaid movement the circuit closing device $h^2$ has reached an angular position with respect to the resistance wire $g^1$ which corresponds to the angular position of the circuit closing device $c^3$ with respect to the resistance wire $b^1$ exactly the resistance values of the two branches of the branch circuit are equal to each other and the bridge branch $K^6$ becomes instantly devoid of current. The two galvanometer pointers return to their zero positions shown in the drawing in which positions the circuit closing devices $k^9$ $m^3$ $m^4$ are opened and the exciting coil $g^4$ is accordingly likewise devoid of current. The force in a lateral direction which was hitherto acting on the Cardan ring J ceases, and the shaft H stabilizable by the gyroscope remains consequently stationary in its new angular position. This new angular position agrees with the new angular position of the stabilizable shaft C of the gyroscope at the observing station.

A corresponding action takes place when the pointer $c^2$ which carries the circuit closing device $c^3$ swings in the opposite direction and the pointer $k^7$ touches the two circuit closing devices $m^1$ $m^2$ with its circuit closing device $k^8$. The force which bears in this case on the armature $i^2$ of the Cardan ring $J$ acts in the direction of the arrow $y$ (see Figure 2) and the movement of the pointer $h^1$ about the axis of the stabilizable shaft therefore takes place in the opposite direction.

Claims:

1. An apparatus of the class described which comprises a stabilizable shaft, a sighting device mounted on said shaft, gyroscopic means for stabilizing said shaft, a two-part electric circuit, a stabilizable body embodying a gyroscopic apparatus and means dependent upon the position of the stabilizable shaft for causing the stabilizable body to assume a similar position.

2. An apparatus of the class described which comprises a gyroscopic apparatus, a stabilizable shaft controlled by said gyroscopic apparatus, a sighting device on said stabilizable shaft, a circuit closing device operatable by said stabilizable shaft, a stabilizable body embodying a gyroscopic apparatus, electro-magnets mounted adjacent said stabilizable body, armatures on said stabilizable body, an electric circuit and means operatable by the circuit closing device for energizing said electro-magnets for changing the position of the stabilizable body.

3. An apparatus of the class described which comprises a stabilizable shaft, a gyroscopic apparatus for stabilizing said shaft, a sighting device carried by said shaft, a circuit closing device operatable by said stabilizable shaft, a casing for said gyroscopic apparatus, a resistance element mounted upon said casing, means for adjusting said casing, means for adjusting said sighting device, a two-part circuit, a stabilizable body, a gyroscopic apparatus for stabilizing said body, a second circuit closing device mounted for movement with said stabilizable body, a second resistance element cooperating with said second circuit closing device, electro-magnets mounted adjacent said stabilizable body, said magnets being included in said two-part circuit, galvanometers in said circuit, circuit contact devices operated by one of said galvanometers, said first mentioned circuit closing device co-operating with said resistance element for causing a movement of said galvanometers to energize one of said electro-magnets to change the position of said stabilizable body.

The foregoing specification signed at Essen, Germany, this 16th day of June, 1920.

HERMANN SUNDHAUSSEN.

In presence of—
HANS GOTTSMAN,
FAHAUN DECKERS.